United States Patent [19]

Beach, Jr.

[11] Patent Number: 4,747,679
[45] Date of Patent: May 31, 1988

[54] MIRROR HEAD ASSEMBLY FOR TRUCKS

[75] Inventor: Theodore L. Beach, Jr., Donnelsville, Ohio

[73] Assignee: Beach Manufacturing Company, Donnelsville, Ohio

[21] Appl. No.: 58,413

[22] Filed: Jun. 5, 1987

[51] Int. Cl.4 .......................... B60R 1/06; G02B 7/18
[52] U.S. Cl. ................................... 350/632; 248/476; 248/479
[58] Field of Search ............... 350/632, 639; 248/476, 248/479, 475.1, 480, 484, 486, 282

[56] References Cited

U.S. PATENT DOCUMENTS

| | | | |
|---|---|---|---|
| 3,119,591 | 1/1964 | Malecki | 248/282 |
| 3,282,549 | 11/1966 | Crawford . | |
| 3,322,388 | 5/1967 | Budreck | 248/282 |
| 3,343,779 | 9/1967 | Beach, Jr. . | |
| 3,360,228 | 12/1967 | Murdoch | 248/480 |
| 3,546,963 | 12/1970 | Truett . | |
| 3,802,766 | 4/1974 | Magi . | |
| 4,344,672 | 8/1982 | Bleiweiss et al. . | |
| 4,550,988 | 11/1985 | Harder et al. . | |

OTHER PUBLICATIONS

Beach Manufacturing Company (undated) catalog S Series, 1600–2600 Aluminum; S Series 16–2600 Steel; TRANSTART–Cabover 4070B Series; TRANSTAR–Cabover 9670 Series; TRANSTAR, Conventional 4200–4370 Series; TRANSTAR, Conventional 9370 Series; CARGO STAR and PAYSTAR 5000 Series.

Primary Examiner—Jon W. Henry
Attorney, Agent, or Firm—Biebel, French & Nauman

[57] ABSTRACT

A side mounted rear view mirror head assembly for trucks includes a mirror head formed with a sheet metal back or cover and a mirror, enclosed between a pair of end caps, in which an intergral extended portion of the end caps define lateral slots providing for corresponding lateral adjusting movement of a mirror head on a generally U-shaped support arm. The mirror head itself includes a square tie bar which extends between the end caps and is fitted into tie bar engaging bosses in the end caps, to resist twisting of one end cap with respect to the other, and to stiffen the mirror head.

2 Claims, 3 Drawing Sheets

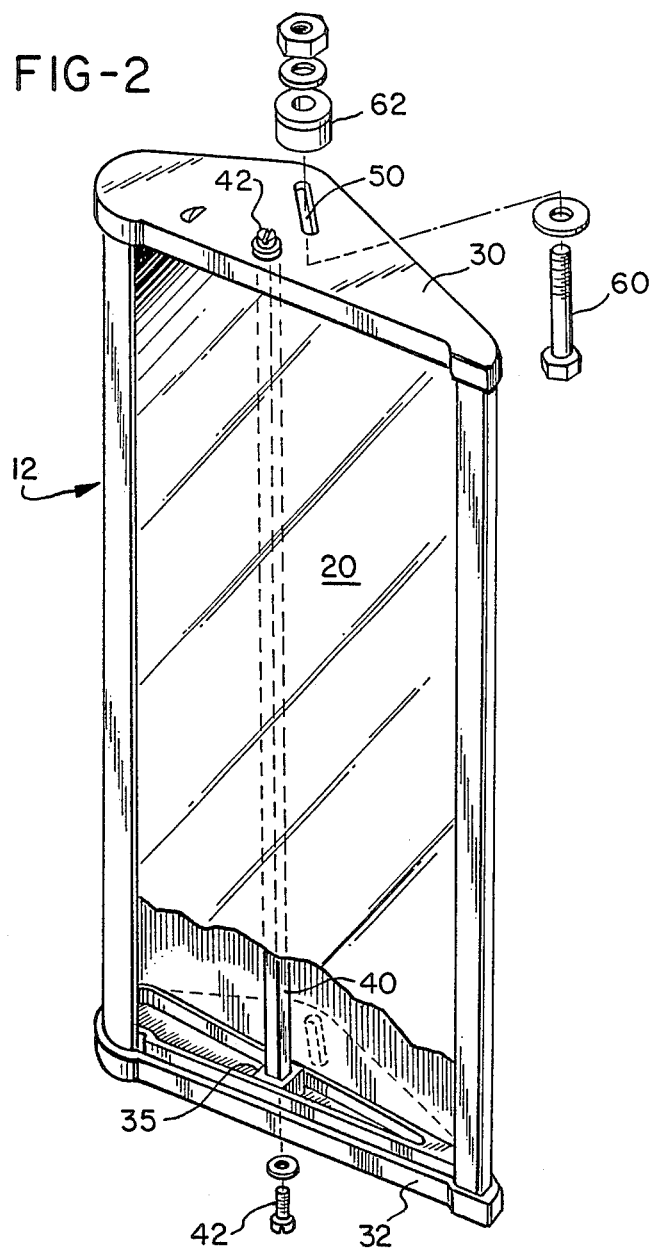

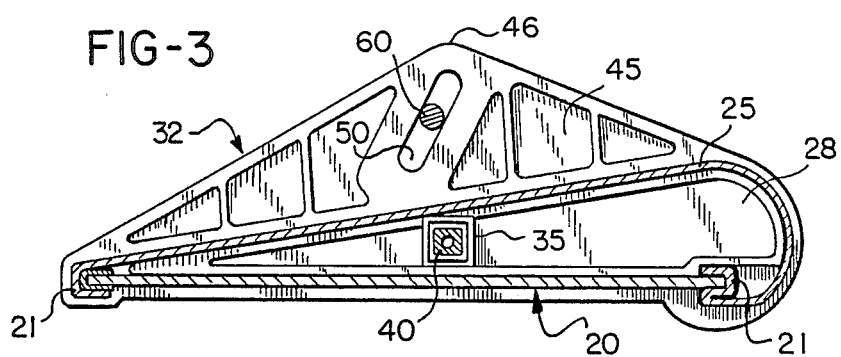
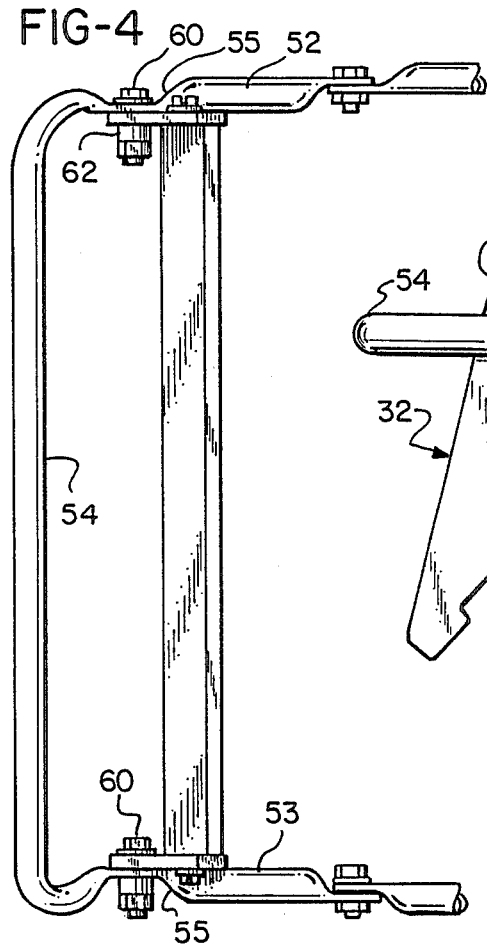
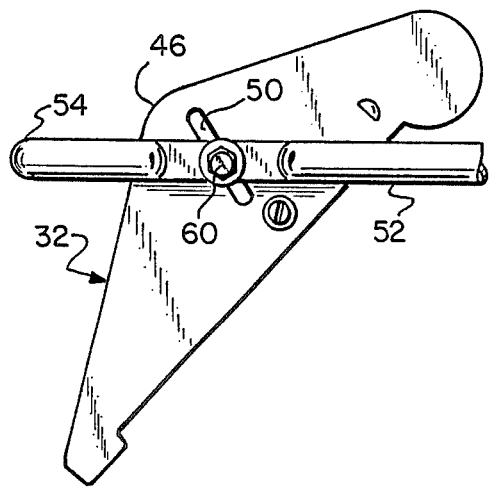

MIRROR HEAD ASSEMBLY FOR TRUCKS

BACKGROUND OF THE INVENTION

This invention relates to side rear view mirrors for trucks and the like and more particularly to a rear view mirror head and an arrangement for mounting the head on the support arm providing for adjustment of the head both laterally and angularly or pivotally with respect to the arm.

In my U.S. Pat. No. 3,343,779 I have disclosed a rear view mirror head which aerodynamically presents a minimum of wind resistance. The mirror head includes a body or cover of sheet metal extending between a pair of spaced apart end caps and trapping a mirror in spaced relation to the main body of the sheet metal cover. The end caps, formed of injection molded plastic material, are configured to receive the opposite terminal edges of the cover, and the ends of the mirror and provide space between the cover sheet and the mirror, through which a cylindrical rod extends longitudinally through the end caps and between the sheet material and the mirror, to tie the assembly together.

In my prior inventon, the end caps were configured to conform to the shape of the sheet metal cover and glass, and the mounting arrangement included the longitudinally extending rod. If it was desired to provide for lateral adjustment of the mirror head with respect to the mounting arm, it was necessary to provide an auxiliary adjusting mechanism for that purpose. Usually, an encircling clip, at each end of the mirror head, connected the through rod to the adjacent U-shaped support arm, and the position of the mirror head was adjusted by loosening the clip and causing the same to slide along the tubular arm. The arrangement was less than entirely satisfactory for a number of reasons. First, all of the wind loading and forces on the mirror were placed directly on the shaft. The shaft was cylindrical and under certain conditions could permit the mirror head to twist. Second, the lateral position or adjustment of the mirror depended upon the ability to slide the encircling clip along the body of the support arm, and then on the retightening sufficient to hold the part in a predetermined relation.

There accordingly exists a need for an improved mirror head mounting arrangement, which provides for stiffening of the mirror head, and provides for the adjustable mounting of the mirror head at the end caps, upon the support arm.

SUMMARY OF THE INVENTION

This invention is directed to a truck mirror head assembly and more particularly to an assembly and mounting arrangement for such mirror head to a support arm which provides greater strength and versatility than heretofore available.

The mirror head includes a mirror and enclosind cover which are supported between a pair of spaced end caps, as in my prior patent. However, the end caps are provided with an integral web-like extension portion defining an elongated transverse slot along which the mirror head is mounted to the support arm. The support arm is flattened at the points of attachment, to permit a tightening of the adjusting and connecting stud extending through the slot with higher clamping forces than have heretofore been available when clamping to the tubular body of the arm, further providing for a more precise location of the mirror head mounting stud in relation to the support arm. The transverse slot receives the mounting stud, at each end of the mirror head, and permits both rotational and lateral adjustments of the position of the mirror on the arm.

The mirror head is improved by the employment of a rectangular shaft or tie rod, preferably of square configuration, the ends of which are received in conforming injection molded locator portions on the insides of the end caps, and retained by end screws. The rectangular or square shaft transmits bending torques from one end cap to the other, and tends to add substantial stiffness to the overall unit. Further, the support of the tie rod or shaft in the mirror head is simplified by the fact that the rod is not required to carry the mounting forces on the mirror head itself.

It is accordingly an object of this invention to provide an improved mounting arrangement for a truck mirror head.

Another object of the invention is to provide an enclosed mirror head incorporating end caps, in which the end caps integrally form or define mounting slots.

Another object of the invention is the provision of a mirror head having a square stiffening and connecting shaft extending therethrough.

These and other objects and advantages of the invention are apparent from the following description, the accompanying drawings and the appended claims.

FIG. 2 is a perspective, partially broken away and partially exploded view of the improved mirror head of this invention;

FIG. 3 is a transverse section through the mirror head;

FIG. 4 is an elevational view showing the mirror head mounted on the improved mounting arm; and FIG. 5 is a plan view of the mirror head mounted on the arm.

DESCRIPTION OF PREFERRED EMBODIMENT

Figure 1:
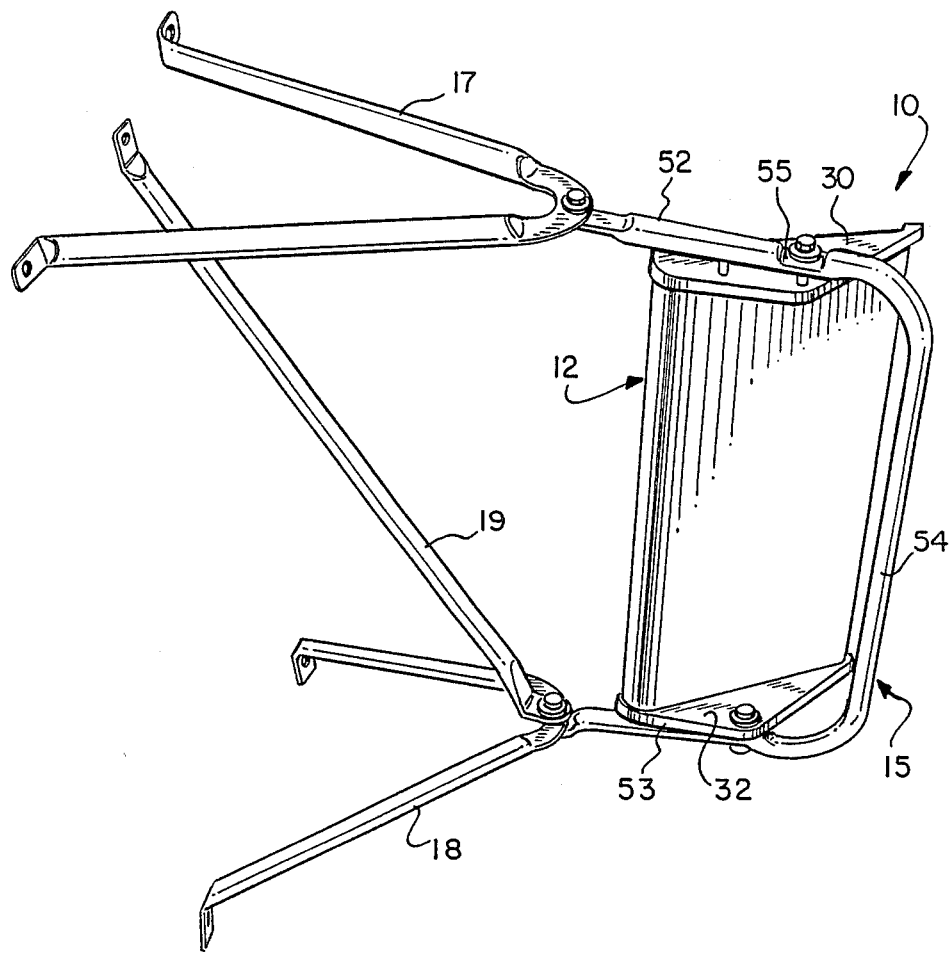
FIG. 1 is a perspective view of a mirror head constructed in accordance with this invention mounted on a mounting arm and on upper and lower mounting brackets.

Referring to the figures of the drawing, which illustrate a preferred embodiment of the invention, an improved side mounted rear view mirror head assembly for trucks and the like is illustrated generally at 10 in FIG. 1. The head assembly of this invention includes a truck mirror head shown generally at 12, and a generally U-shaped tubular metal mirror head support arm shown generally at 15. FIG. 1 also shows conventional upper and lower mounting brackets 17 and 18 and a diagonal brace or arm 19, which may be used in combination with the mirror head assembly 10, but which forms no part of the present invention. In fact, the U-shaped mirror head support arm may, in many instances, be used alone, where the extra extension afforded by the upper and lower mounting brackets is not required.

Reference may be had to FIGS. 2 and 3 for details of the mirror head 12. Thus, the mirror head 12 includes a planar mirror 20, retained in the inwardly directed channels 21 of an encircling generally tear-drop shaped sheet metal cover 25 (FIG. 3). The mirror 20 and the cover 25 may be formed and configured substantially according to the teachings of my above-defined patent and referred to therein respectively by the reference numerals 19 and 10.

Since the enclosing back cover 25 is tear-drop shaped, and the mirror 20 is planar, an internal space 28 is defined therebetween. The cover and the mirror are substantially coextensive, and extend between enclosing end caps 30 and 32. The end caps may be injection molded of thermosetting material, such as filled nylon, and effectively close the space 28 formed between the mirror 20 and cover 25.

The end caps 30 and 32 also include an integral generally centrally positioned rectangular or square socket means or boss 35, as shown in FIG. 3, for receiving one end of a square tie bar 40, formed as a square shaft. The tie bar or shaft 40 extends in the space 28 between the end caps 30 and 32 with the respective ends of the tie bar received in the bosses 35. Retainer screws 42 may be received on an outer surface of the end caps and threaded into the interior of the ends of the tie bar 40 for retaining the tie bar in the associated end cap, and for retaining the end cap in place on the assembled mirror and cover. The sockets or bosses couple the shaft 40 to the end caps and transmit twisting torques to the shaft 40. It will be seen that any twisting or torsional forces applied to the mirror head 15 will be transmitted by one or the other of the end caps, through the bosses 35, into the square shaft 40 defining the tie bar, and thus the tie bar not only retains the parts together in a rigid condition, but also resists torsional twisting.

The invention further includes a simplified arrangement for mounting the mirror head 12 on the support arm 15, to provide for pivotal and limited lateral adjustment of the head with respect to the arm. For this purpose, as best shown in FIG. 3, each of the end caps is provided with an integral, forwardly-extending generally triangularly shaped web portion 45 terminating at an apex 46, and leading smoothly to the opposite ends of the end cap from the apex. The web portion 45 defines an elongated generally transversely extending slot 50. An identical slot 50 is formed in each of the end caps 30 and 32, although only the end cap 32 is shown in FIG. 3.

The mounting arrangement further includes means associated with the arm 15 for engaging the mirror head at the slots 50. The mirror head support arm 15 may be considered as including generally horizontal top and bottom mirror head mounting sections 52 and 53 joined at a common generally vertical connecting section 54. The mounting sections 52 and 53 are each formed with a transversely flattened mounting region 55, as best shown in FIG. 4. The sections 55 are flattened inwardly from the outer surfaces of the respective sections 52 and 53, thereby defining a generally flat and planar inner surface thereof.

The sections 52 and 53 are spaced apart a width sufficient to receive the end caps 30 and 32 of the mirror head 12 therebetween. Means for pivotally joining the mirror head 12 at the slots 50 to the arm 15, includes a pair of stud bolts 60 which extend from an inside surface of the cap web 45, through the slot 50, and through a suitable opening, not shown, at the flattened mounting region 55, as shown in FIG. 4. A plastic or fiber cylindrical collar 62 may be used on the stud bolt 60 to permit the bolts to be torqued down and to provide a pivotal friction fit. Thus, the mirror head 15 may be adjusted laterally on the arm 15 as well as pivotally with respect to the arm and the adjustment retained by the stud bolts 60. The flattened mounting regions 55 permit a substantial mounting torque to be applied by the bolts 60 at the web 45 of the end caps without fear of further crushing the tubular material making up the arm 15.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. An improved side mounted rear view mirror head assembly for trucks in which a mirror and an enclosing back cover define an internal space therebetween and are mounted and retained between a pair of end caps, the improvement comprising:

integral means in each of said end caps defining generally transversely extending mirror head adjusting slots, said slots being positioned adjacent said back cover and on the side of said caps remote from said mirror, a generally U-shaped tubular metal mirror head support arm, including generally horizontal top and bottom mirror head mounting sections joined at a common generally vertical connection section, means in each of said mounting sections defining a transversely flattened mounting region, said mounting regions being generally in vertical alignment to each other, bolt means joined to said arm at one of said regions and extending through an associated one of said slots in said end caps providing for pivotal and lateral adjustment of said head with respect to said arm, tie bar means in said space between said mirror and said cover, said tie bar means formed as a square, and socket means formed in each of said caps for receiving an end of said shaft for coupling said shaft to said caps and transmitting twisting torques to said shaft.

2. An improved side mounted rear view mirror head assembly for trucks in which a mirror and an inclosing back cover define an internal space therebetween and are mounted and retained between a pair of end caps, the improvement comprising:

integral web means in each of said end caps defining generally transversely extending mirror head adjusting slots, said slots being positioned adjacent said back cover and on the side of said caps remote from said mirror, a generally U-shaped tubular metal mirror head support arm, including generally horizontal top and bottom mirror head mounting sections joined at a common generally vertical connecting section, means in each of said mounting sections defining a transversely flattened mounting region, said mounting regions being generally in vertical alignment with each other, a pair of stud bolts, one each joined to said arm at one of said regions and extending through an associated one of said slots in said end caps providing for pivotal and lateral adjustment of said head with respect to said arm, tie bar means in said space between said mirror and said cover, said tie bar means formed as a square shaft, and an integral boss formed in each of said end caps for receiving an end of said shaft for coupling said shaft to the associated end cap.

* * * * *